United States Patent [19]

Kobayashi et al.

[11] Patent Number: 5,206,468
[45] Date of Patent: Apr. 27, 1993

[54] LOCKING APPARATUS FOR A DRAWER TYPE CIRCUIT BREAKER

[75] Inventors: Keiji Kobayashi; Yoshimi Fujii, both of Kagawa, Japan

[73] Assignee: Mitsubishi Denki Kabushiki Kaisha, Tokyo, Japan

[21] Appl. No.: 719,136

[22] Filed: Jun. 20, 1991

[30] Foreign Application Priority Data

Jun. 21, 1990 [JP] Japan .................. 2-165219
Jun. 21, 1990 [JP] Japan .................. 2-165220
Jun. 21, 1990 [JP] Japan .................. 2-165221
Jul. 25, 1990 [JP] Japan .................. 2-198556

[51] Int. Cl.⁵ .................. H01H 9/20; H02B 11/00
[52] U.S. Cl. .................. 200/50 AA; 361/336; 361/338; 361/345
[58] Field of Search .................. 200/50 R, 50 AA; 361/335, 336, 337, 338, 339, 343–345

[56] References Cited

U.S. PATENT DOCUMENTS

| | | | |
|---|---|---|---|
| 3,560,676 | 2/1971 | Battaglia | 200/50 AA |
| 4,743,715 | 5/1988 | Gerbert-Gaillard et al. | 200/50 AA |
| 4,754,367 | 6/1988 | Bohnen | 361/344 |
| 4,761,521 | 8/1988 | Beck et al. | 200/50 AA |

FOREIGN PATENT DOCUMENTS 59-32871  8/1984  Japan .
62-115710  7/1987  Japan .

*Primary Examiner*—J. R. Scott
*Attorney, Agent, or Firm*—Burns, Doane, Swecker & Mathis

[57] ABSTRACT

A locking apparatus for a drawer type circuit breaker that restricts movement from the test/disconnection position to the operation position on a switchboard. The locking apparatus has a connection sensor for detecting the connection of a switchboard side plug into a drawer type circuit breaker plug. A switchboard-mounted stopper contacts a lock pin mounted to the drawer type circuit breaker when the connection sensor fails to detect a connection between the plugs. The drawer-type circuit breaker has a mounted lock lever for securing the plugs together. The locking apparatus also has an access-inhibiting plate for preventing operator access to the plugs when the circuit breaker is between the test/-disconnection position and the operation position.

14 Claims, 24 Drawing Sheets

LOCKING APPARATUS FOR A DRAWER TYPE CIRCUIT BREAKER

BACKGROUND OF THE INVENTION

1. Field of the Invention

The present invention relates to a locking apparatus for a drawer type circuit breaker.

2. Prior Art

An electrical connection between the controller and switchboard of a drawer type circuit breaker is established either by a terminal board, plug-to-plug connection, or automatic connection device. The automatic connection device is the best of these three alternatives but is relatively expensive and therefore the terminal type or plug-to-plug type is used more often. Plug type circuit breakers are particularly easy to connect and disconnect.

The plugs of the conventional plug-to-plug type circuit breaker can be connected and disconnected in any one of three positions; a disconnect position where the plug is not inserted into the controller, a test position where the plug is inserted into the controller, and an operation position where the main terminals of the circuit breaker and the fixed terminals are closed. For example, if the plug is accidentally disconnected while in the operation position, excessive current will not be interrupted.

SUMMARY OF THE INVENTION

An object for the present invention is to provide a locking apparatus for a drawer type circuit breaker which inhibits the electrical connection or disconnection of plugs for electrically connecting the controller and the switchboard when the circuit breaker is either in the test position, the operation position or between the disconnect and operation positions.

The locking apparatus has a plug-connection sensor for sensing a connection of a first plug on the switchboard side into a second plug drawer type circuit breaker side, a lock lever for locking the first plug to the second plug, and a lock pin drivingly connected to the plug-connection sensor. A stopper is mounted on the switchboard. The lock pin moves down, engaging the stopper and inhibiting engagement the circuit breaker and switchboard when the plug-connection sensor does not detect that the first and second plugs are connected with each other. The lock pin moves up, out of engagement with the stopper, allowing the circuit breaker to engage the switchboard when the plug-connection sensor detects connection between the first and second plugs. The circuit breaker has a lock lever mounted thereon for locking the first plug to the second plug. The locking apparatus also restricts operator access to the first and second plugs when the circuit breaker is located between the test/disconnection position and the operation position.

DETAILED DESCRIPTION OF THE PREFERRED EMBODIMENTS

First embodiment

Figure 8:
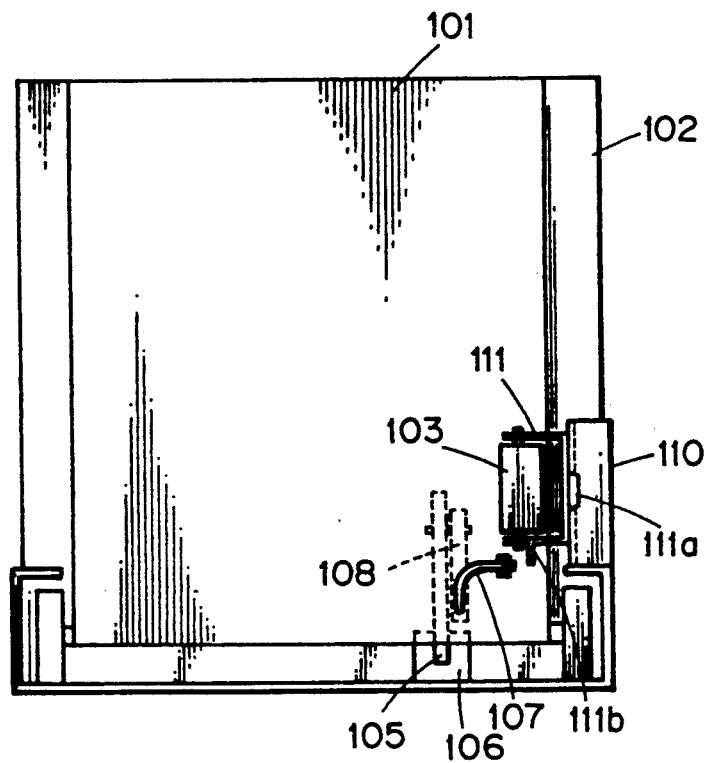
FIG. 8 shows a front view of a circuit breaker on a switchboard, with the second embodiment of a circuit breaker locking apparatus as shown in FIG. 10A.

FIG. 8 shows a front view of a drawer type circuit breaker 101 and a switchboard 102 using the claimed invention.

Figure 9:
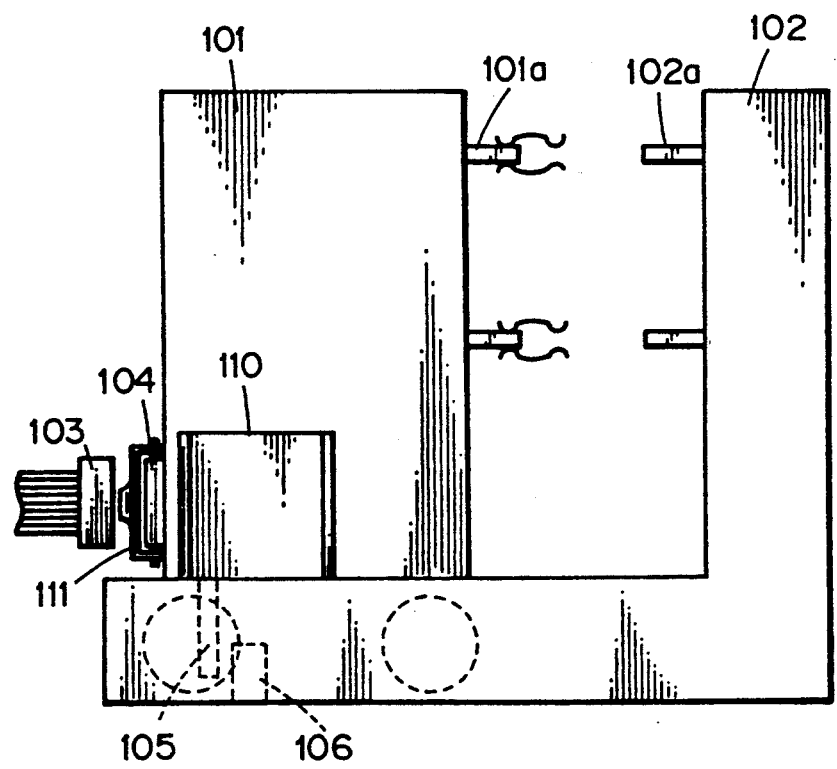
FIG. 9 shows a side view of a circuit breaker with a circuit breaker locking apparatus disengaged from a switchboard.

In the embodiment of FIG. 9, the drawer type circuit breaker 101 is disengaged from switchboard 102, disconnecting the main circuit terminals 101a from the fixed electrodes 102a of the switchboard 102 and plug 103 on the side of switchboard is disconnected from plug 104 on the side of the circuit breaker 101. A lock pin 105 projects downwardly from the circuit breaker 101. If the circuit breaker 101 is advanced toward the operation position with the plug 103 unplugged from the plug 104, the lock pin 105 is blocked by a lock plate 106 mounted in upright position on the bottom of the switchboard 102.

Figure 2A:
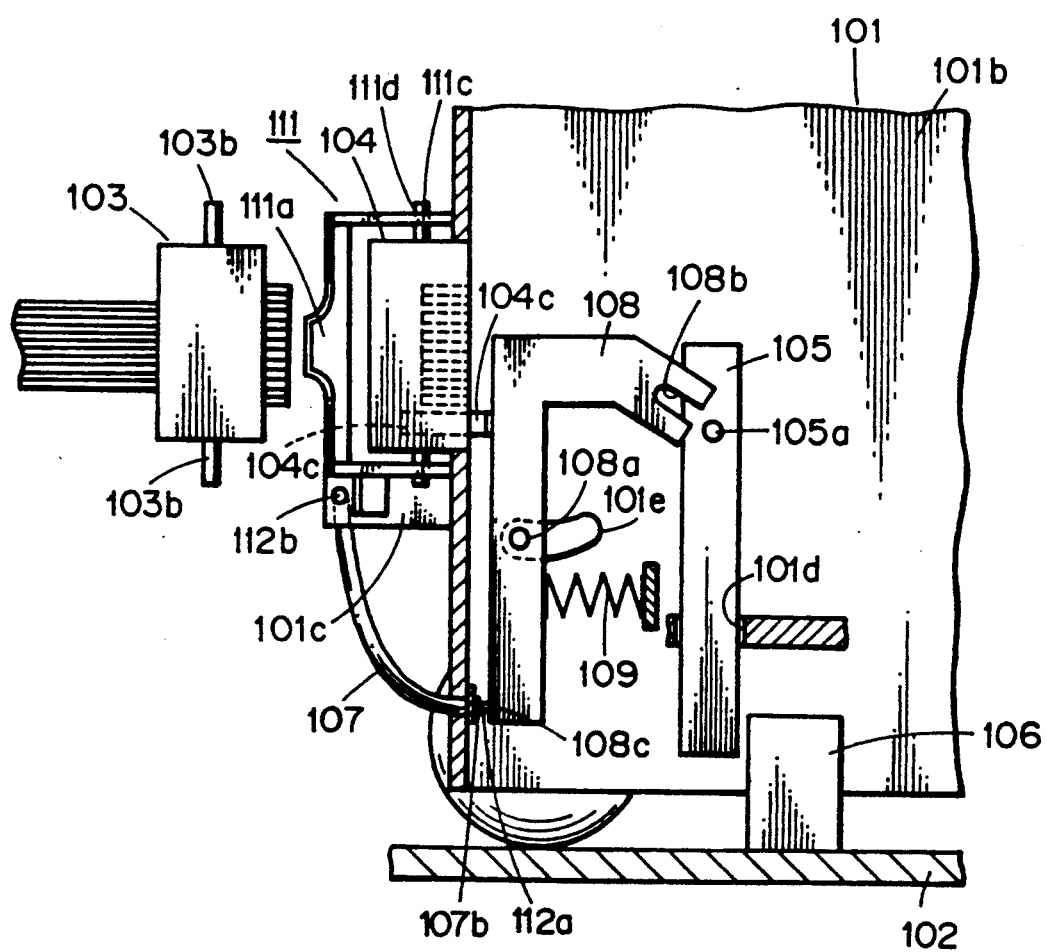
FIG. 2A shows a side view of a first embodiment of a circuit breaker locking apparatus.

As shown in FIG. 2A, a substantially L-shaped link 108 having a bifurcation 108b and a horizontally projecting pin 108a on its long arm is provided in the circuit breaker 101. The pin 108a secured to the link 108 slidably engages a groove 101e provided in a housing 101b when pushed by one end 112a of a wire 112. The link 108 is urged by a compressed spring 109 clockwise at a position slightly below the pin 108a. One end 107a of the sleeve of a push-pull cable 107 is secured to a support 101c fixed on the frame 101b and the end 107b is directly secured to housing 101b as shown in FIG. 2A. The wire 112 in the push-pull cable 107 slides within the sleeve when the wire 112 is pushed at its exposed end 112a or 112b. A plug 104 is mounted on the exterior surface of housing 101b of circuit breaker 101 allowing plug 103 to be electrically connected to the control circuit of the circuit breaker establishing a completed circuit between the switchboard and an external circuit. The plug 104 has a drive pin 104c which is slidably held in the plug 104 and abuts the rear of the link 108. When the plug 103 is inserted into the plug 104, the plug 103 pushes the drive pin 104c outwardly on the plug 104 to push the link 108. The link 108 rotates clockwise about the pin 108a, so that the bifurcation 108b engages a horizontally projecting pin 105a of the lock pin 105. The lock pin 105 extends vertically through a supporting hole 101d made in an arm horizontally projecting from the inner wall of the housing 101b.

Figure 1A:
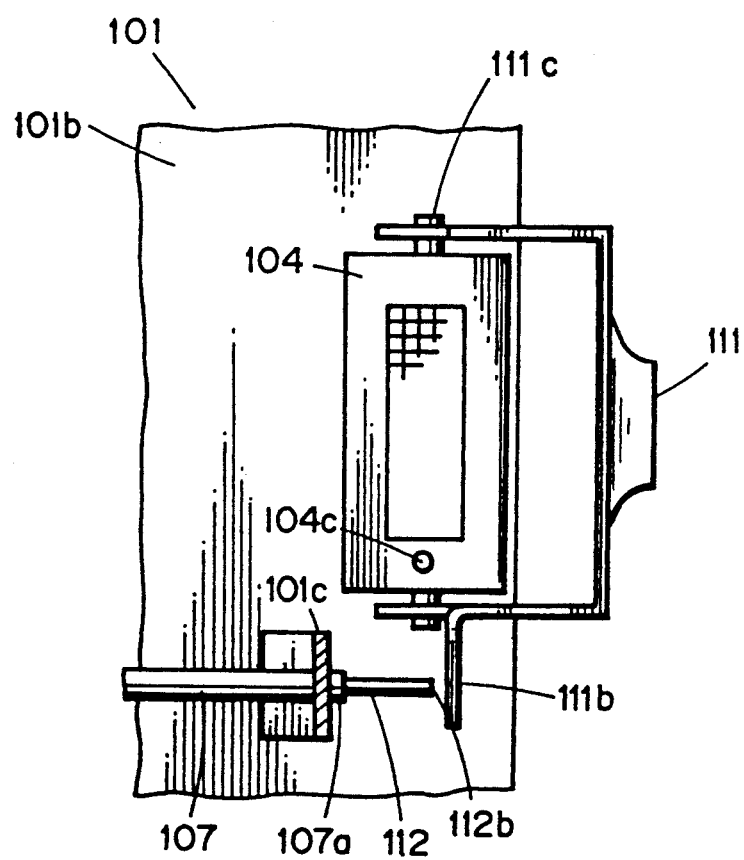
FIG. 1A is a front view of a first embodiment of a locking apparatus of the invention.
Figure 1B:
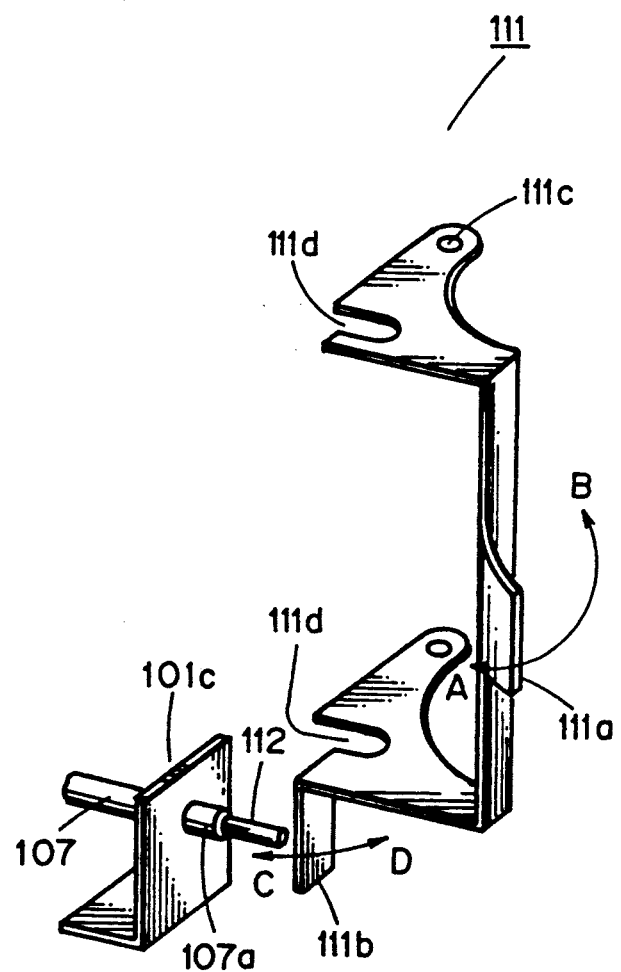
FIG. 1B depicts the locking handle (111) and plug connection sensor (112) of FIG. 1A.
Figure 2B:
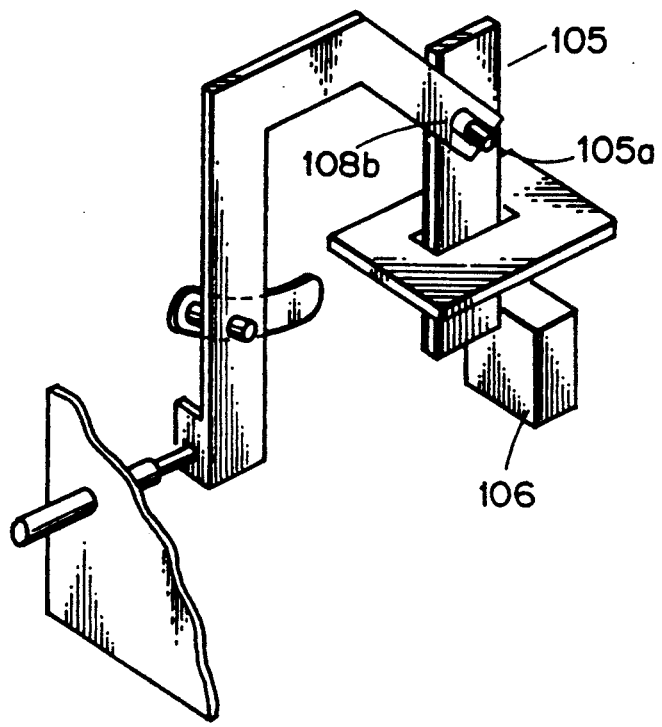
FIG. 2B shows the locking means of a first embodiment as shown in FIG. 2A.
Figure 2C:
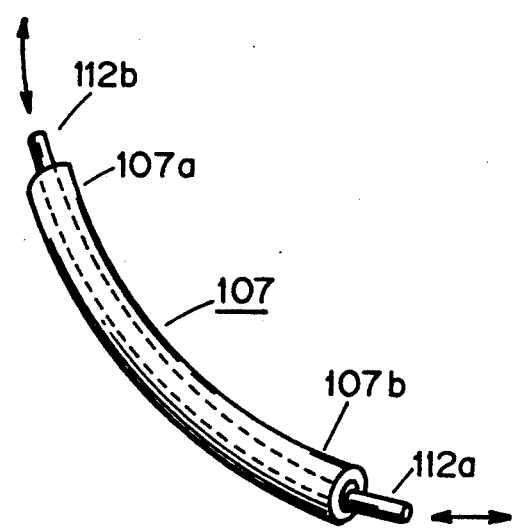
FIG. 2C shows the sensing cable of a first embodiment as shown in FIG. 2A.
Figure 3:
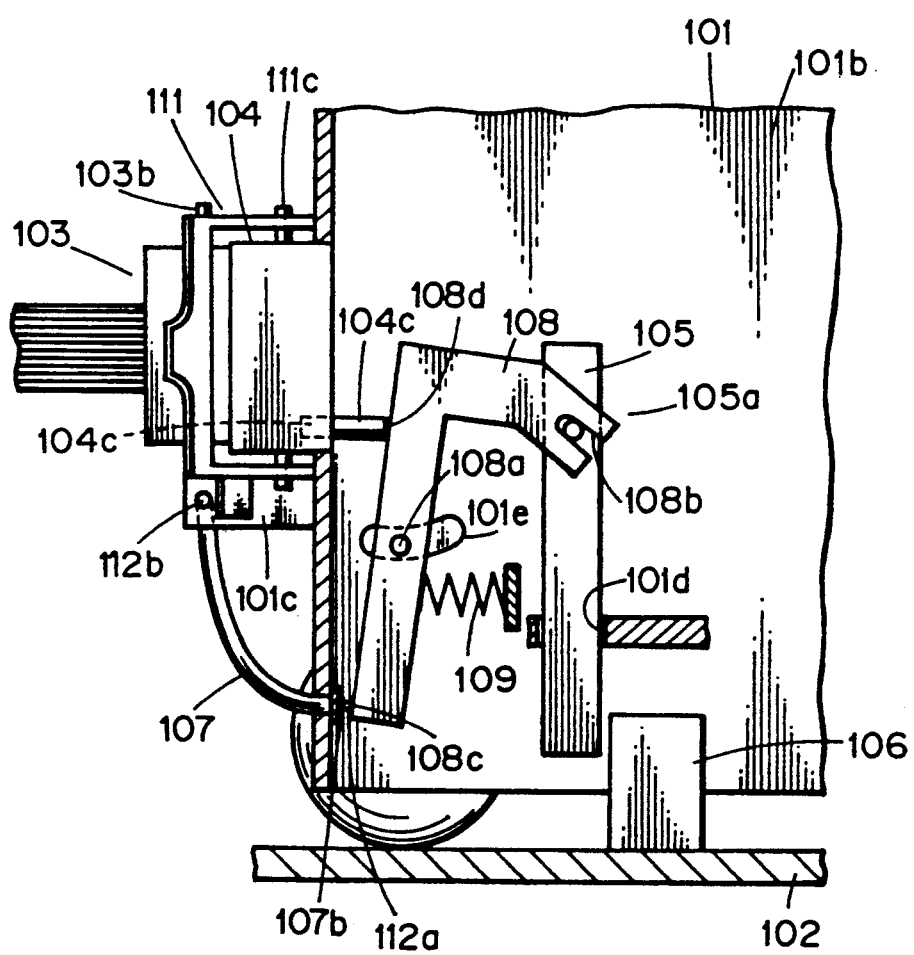
FIG. 3 shows a first embodiment of FIG. 2A with electrical plug connected and locking apparatus in the lock mode.
Figure 4:
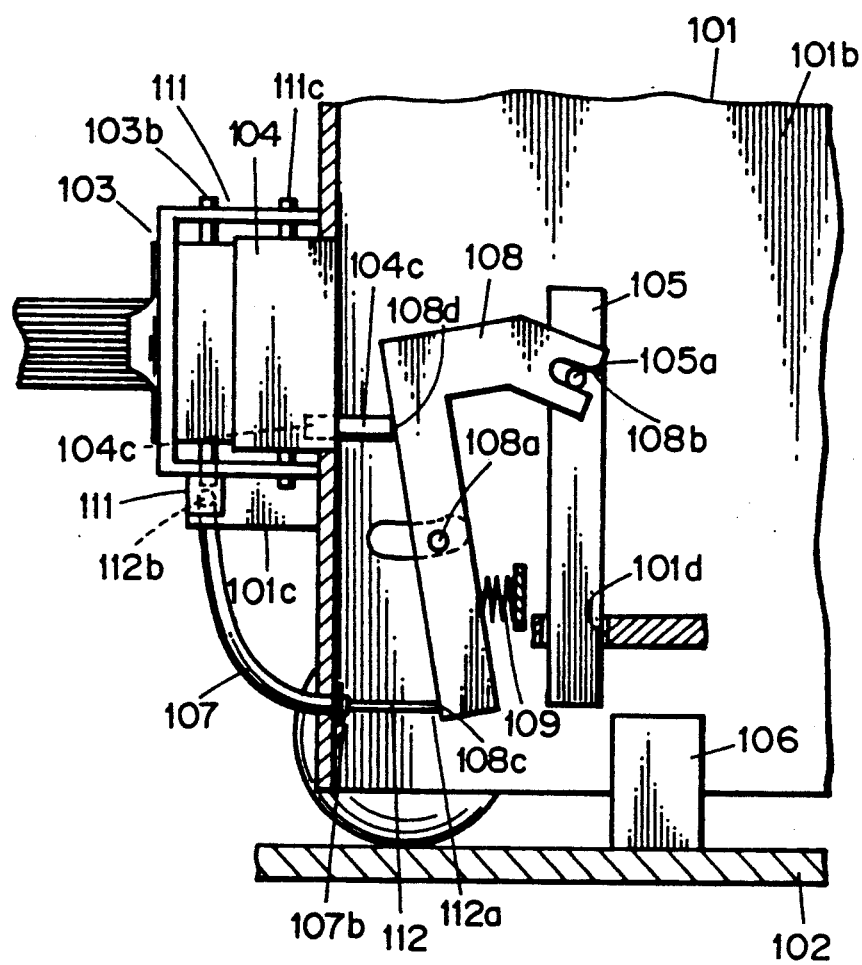
FIG. 4 shows a first embodiment of FIG. 2A with electrical plug connected and locking apparatus in the unlocked mode.
Figure 6:
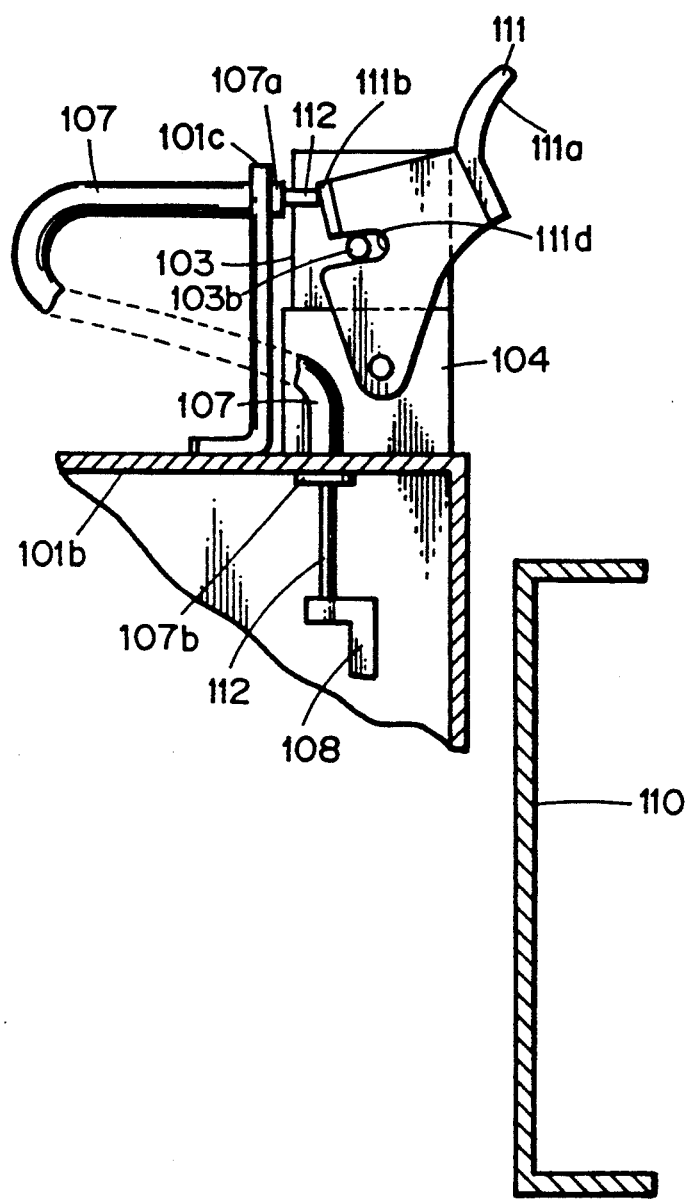
FIG. 6 shows a top view of first embodiment of FIG. 2A of a circuit breaker locking apparatus in the unlocked mode with the circuit breaker disengaged from switchboard and the plug securing lever (111) secured.
Figure 7:
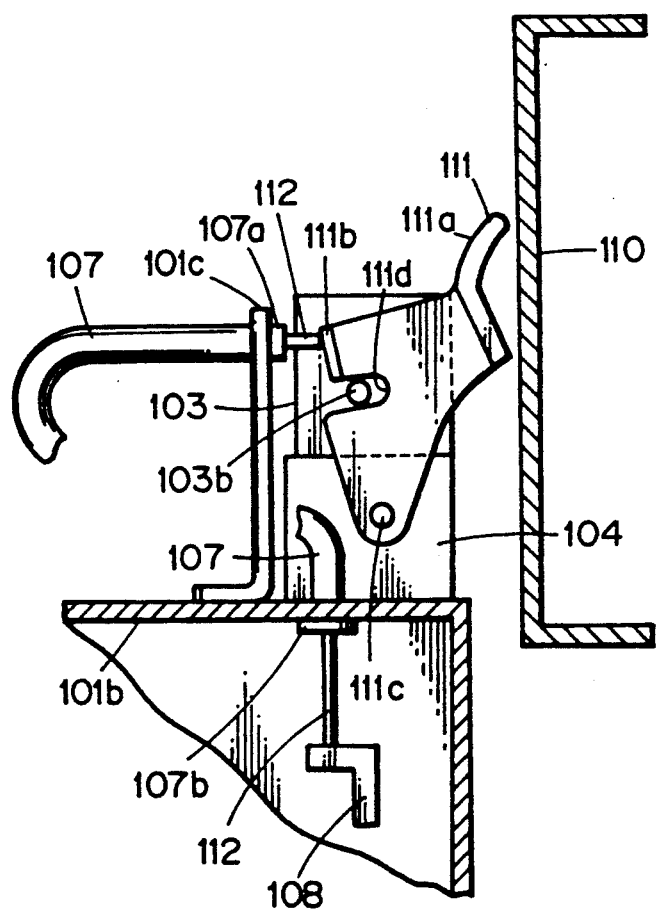
FIG. 7 shows a top view of first embodiment of FIG. 2A of a circuit breaker locking apparatus in the unlocked mode with the circuit breaker engaged to the switchboard, the plug securing lever (111) secured, and the operator inhibiting device (110) preventing operator access to the plug securing lever.

Referring to FIGS. 1A-1B, the lock lever 111 is rotatably mounted to the plug 104 by means of pins 111c. The lock lever 111 has an operating strap 111a on its side, cutouts 111d on upper and lower ends thereof, and a drive projection 111b on the lower end. When the lock lever 111 is rotated toward in the locked position depicted by the arrow A in FIGS. 1B, pins 103b of the plug 103 advance into the cutouts 111d locking the plug 103 into the plug 104. At this time, as shown in FIGS. 2A and 2B and FIG. 6, the drive strap 111b pushes the wire 112 of the push-pull cable 107 advancing end 112a. The engagement portion 108c of the link 108 is advanced by contact with wire 112a causing the link 108 to rotate counterclockwise about a contacting point 108d against a compressed spring 109 as shown in FIG. 4. The counterclockwise rotation of the link 108 causes the lock pin 105 to ascend, so that the lock pin 105 clears the lock plate 106. The above-described mechanical movement allows the circuit breaker 101 to advance past the lock plate 106 toward the operation position. If the lock lever 111 is rotated to the lock position with the plug 103 unplugged from the plug 104, the bifurcation 108b of link 108 will not engage the lock pin 105, so that the lock pin 105 will engage the lock plate 106. Thus, the drawer type circuit breaker 101 cannot be advanced to the operation position unless the plug 103 is inserted into the plug 104 and lock lever 111 is rotated, locking plug 104.

As shown in FIGS. 8 and 9, the switchboard 102 has an operation-inhibiting plate 110 that spans from the test position to the operation position. Thus, when the circuit breaker 101 is in an area where the circuit breaker faces the plate 110, the lever 111 is not accessible to an operator. There is no chance that the plug 103 can be accidentally unplugged when the circuit breaker is in this area.

While the embodiment has been described with respect to a case where the plug 103 cannot be connected to or disconnected from the plug 104 when the circuit breaker 101 is between the test/disconnection positions and the operation position, the position of the operation-inhibiting plate 110 may be modified so that the plug 103 cannot be connected or disconnected while the circuit breaker is in the test or operation positions. A mechanical link mechanism may be used in place of the push-pull cable 107.

Second embodiment

Figure 5:
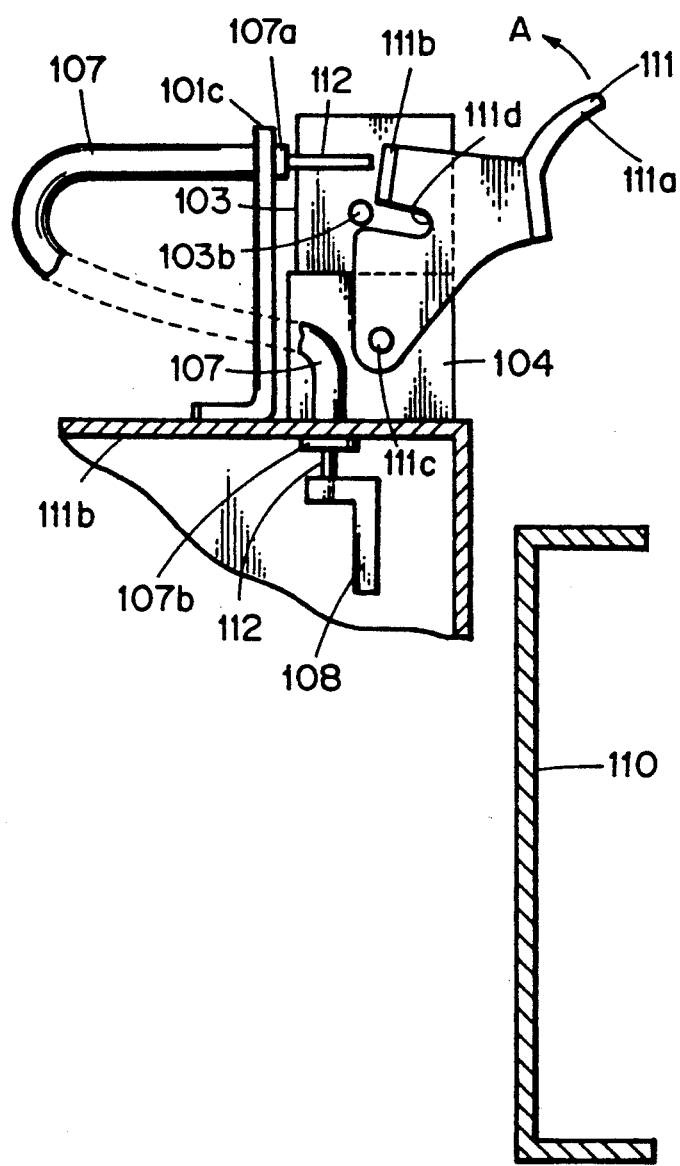
FIG. 5 shows a top view of first embodiment of FIG. 2A of a circuit breaker locking apparatus in the locked mode with the circuit breaker disengaged from switchboard and the plug securing lever (111) unsecured.
Figure 10A:
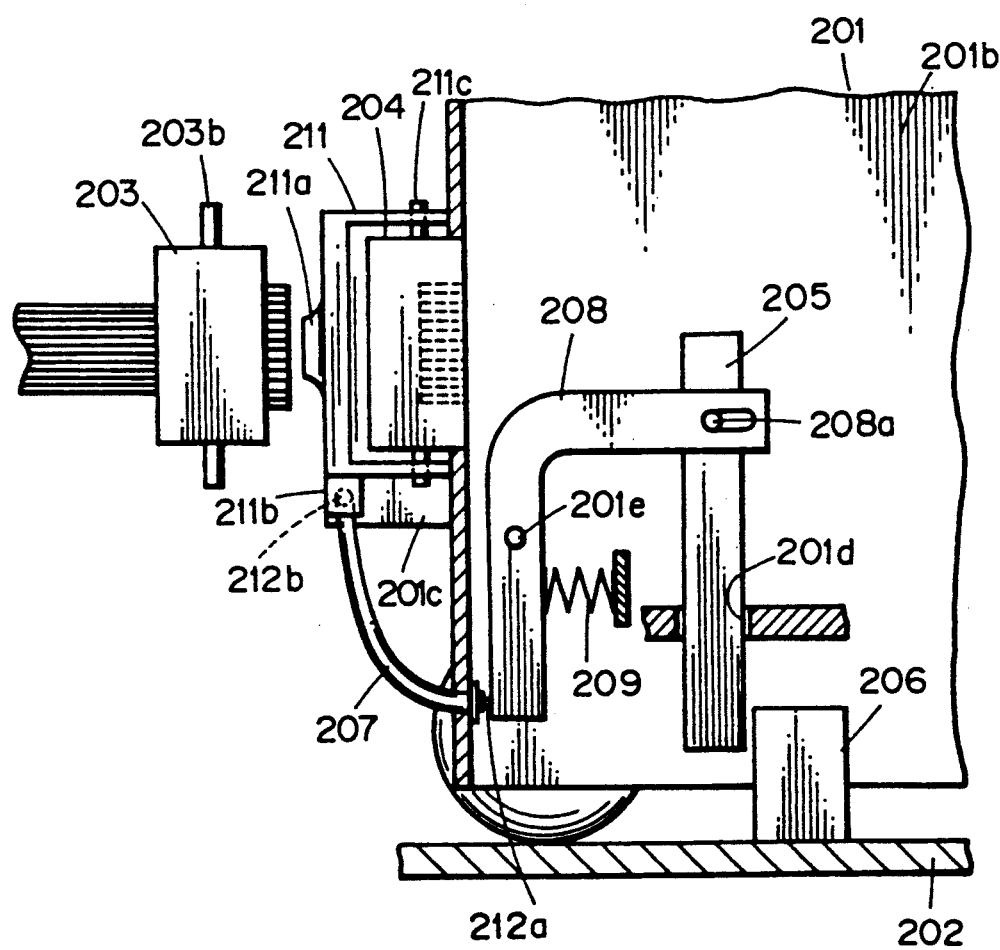
FIG. 10A shows a second embodiment with electrical plug disconnected and circuit breaker locking apparatus in the lock mode.
Figure 10B:
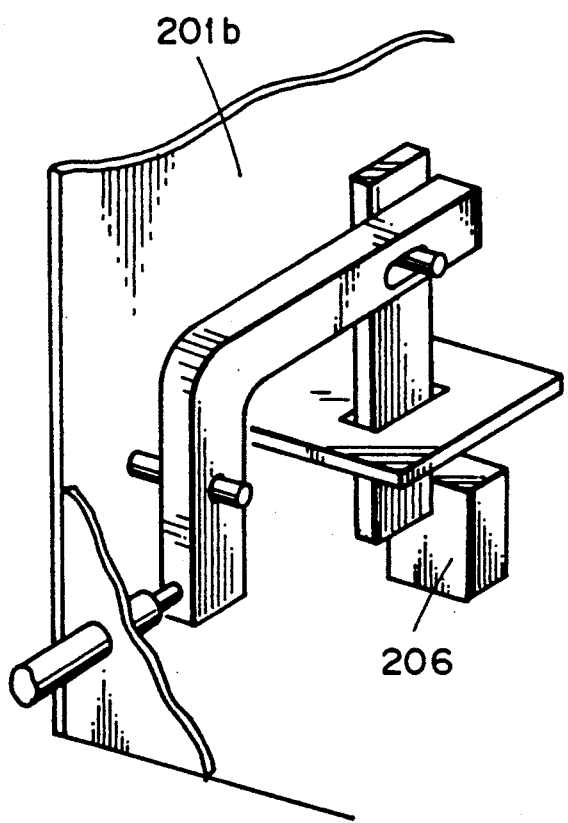
FIG. 10B shows a perspective view of the circuit breaker locking apparatus of FIG. 10A.
Figure 11:
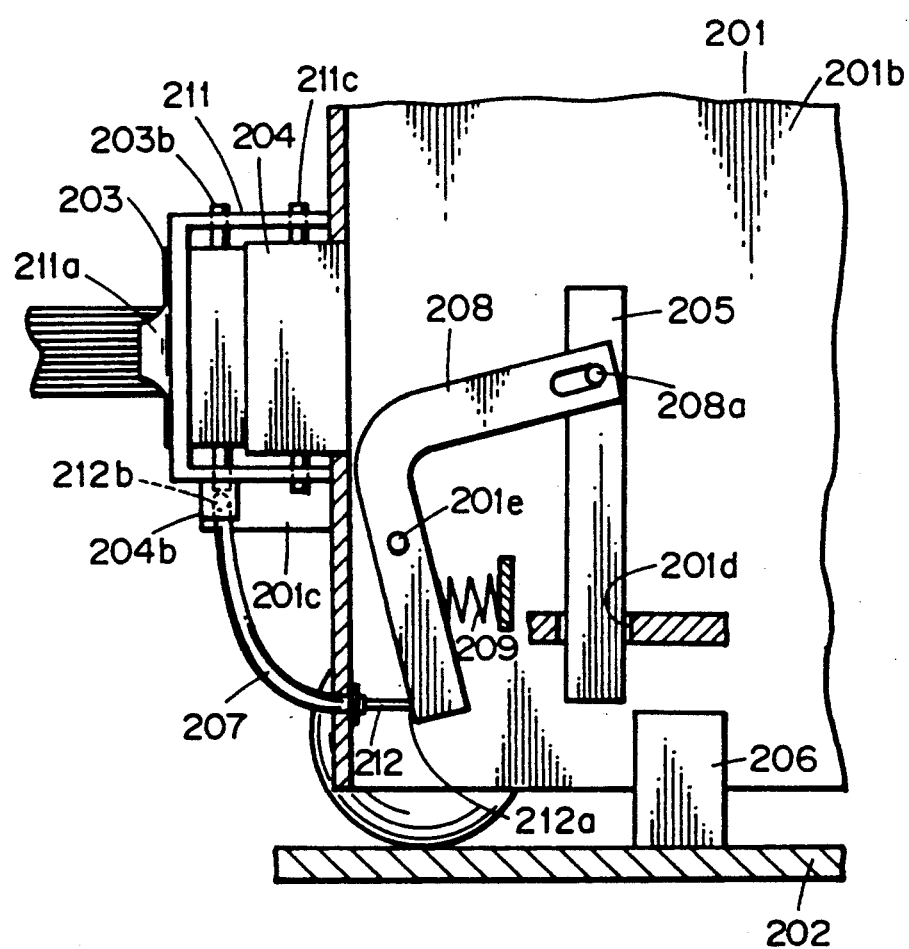
FIG. 11 shows a side view of the embodiment of FIG. 10A with the circuit breaker locking apparatus in the unlocked mode.
Figure 12:
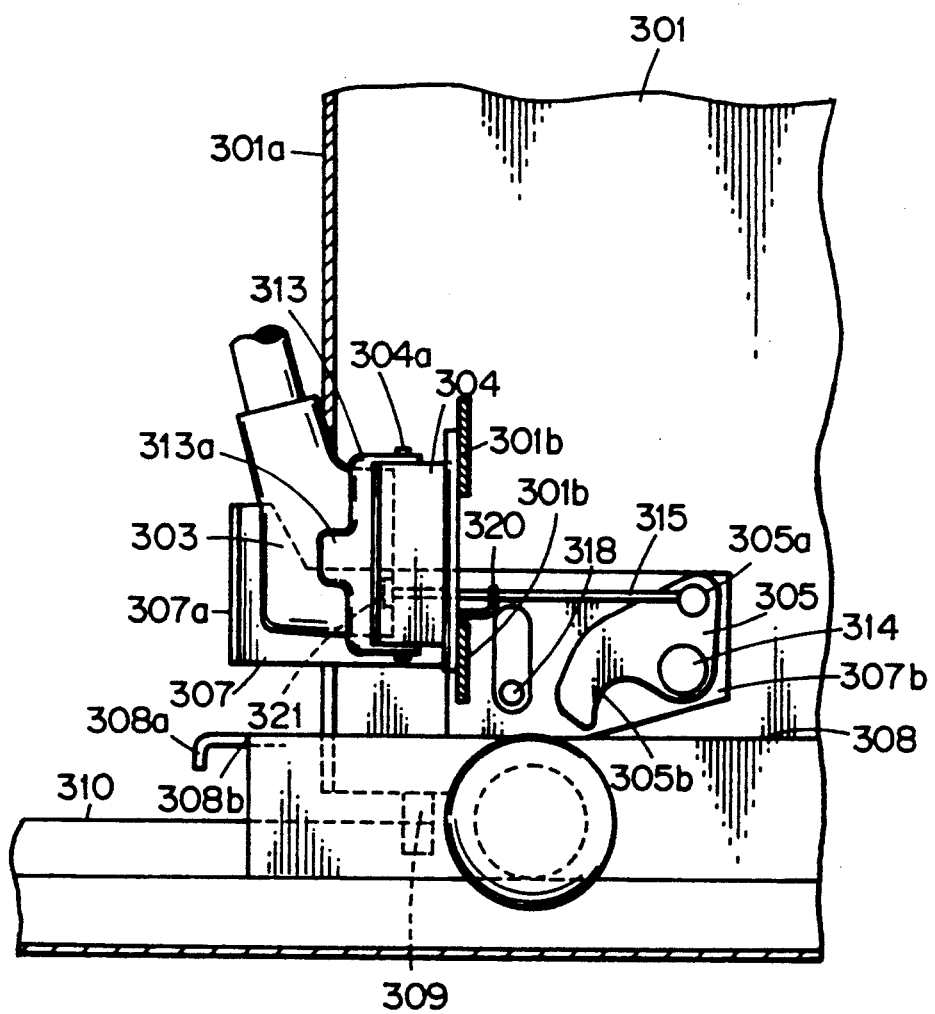
FIG. 12 shows a detail side view of a third embodiment with electrical plug connected and circuit breaker locking apparatus in the unlocked mode.

FIGS. 10A and 10B show a second embodiment of the invention. The second embodiment differs from the first embodiment in that the plug 204 does not have the pin 104c and the link 208 and lock pin 205 are modified from the first embodiment counterparts. The link 208 is mounted to the housing 201b by means of a fulcrum pin 201e. The link 208 is rotatably connected at its right end portion to the lock pin 205 by means of a pin 208a. The lock pin 205 extends through a hole 201d formed in an arm horizontally projecting from the frame and is vertically slidably supported. When the plug 203 is inserted into the plug 204 and the lock lever 211 is rotated in the direction of the arrow A as shown in FIGS. 1 and 5 locking the plug 203 into the plug 204, the wire 212 in the push-pull cable 207 is pushed in at one end thereof and the other end of the wire 212 pushes the link 208 to rotate counterclockwise against the compression spring 209. The rotation of the link 208 causes the pin 205 to ascend above the lock plate 206 so that the circuit breaker 1 is allowed to advance toward the operation position. If the plug 203 is not inserted, the lock pin 205 engages the lock plate 206 so that the circuit breaker 201 cannot advance to the operation position.

Third embodiment

Figure 13:
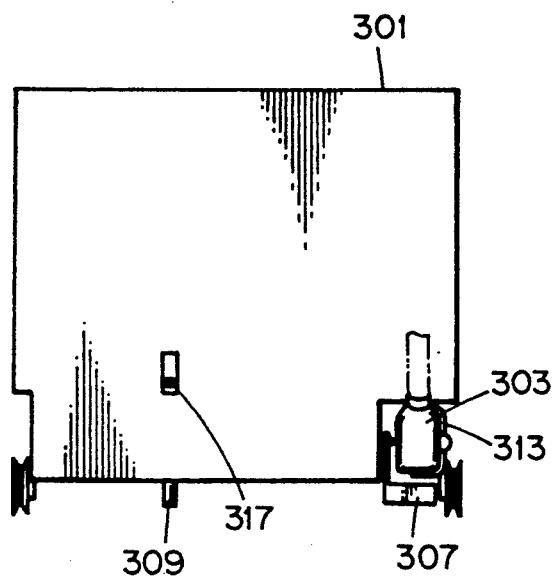
FIG. 13 shows a front view of the embodiment in FIG. 12 with electrical plug connected and circuit breaker locking apparatus in the locked mode.
Figures 14A, 14B, 14C:
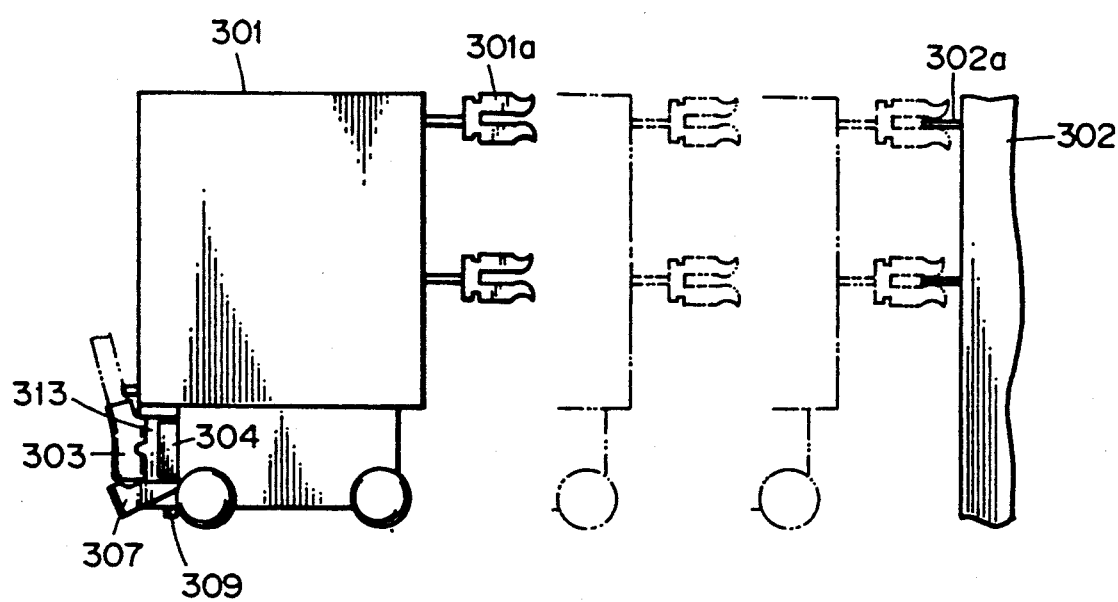
FIGS. 14A-14C show the circuit breaker at the test position, midway between the test position an operating position, and the operating position, respectively.
Figure 19:
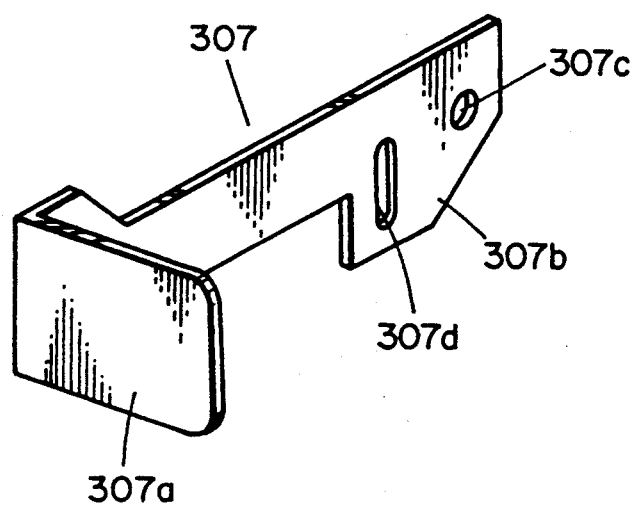
FIG. 19 shows a perspective view of the plug securing lever used in the embodiment of FIG. 12.

FIG. 13 is a front view of a third embodiment and FIGS. 14A-14C are side views of FIG. 13. The plug 304 is mounted to the front of circuit breaker 301 and is connected with the control circuit (not shown) in the circuit breaker 301. The circuit breaker 301 and the switchboard 302 are electrically connected by means of the plugs 303 and 304. The plug 303 is locked to the plug 304 by lock lever 313. The plug cover 307 is rotatably mounted to the circuit breaker 301 by means of a pin extending through a hole 307c shown in FIG. 19. The plug cover 307 has an engaging portion 307b that engages a later described guide plate 308a and a cover 307a that covers the plug 304 when rotated fully clockwise. The plug cover 307 is formed with an elongated hole 307d therein through which the guide pin 308 loosely extends to guide the plug cover 307 when the plug cover 307 rotates about a pin 314.

The circuit breaker 301 moves from the test position (FIG. 14A) to the operation position (FIG. 14C). At the operation position, the contacts 301a of the circuit breaker 301 are connected with the contacts 302a fixed on the switchboard 302. The circuit breaker 301 is provided with a well known interlock pin 309 which can be lifted by operating a lever 317 to lock the circuit breaker 301 at the operation position or the test position.

Figure 15:
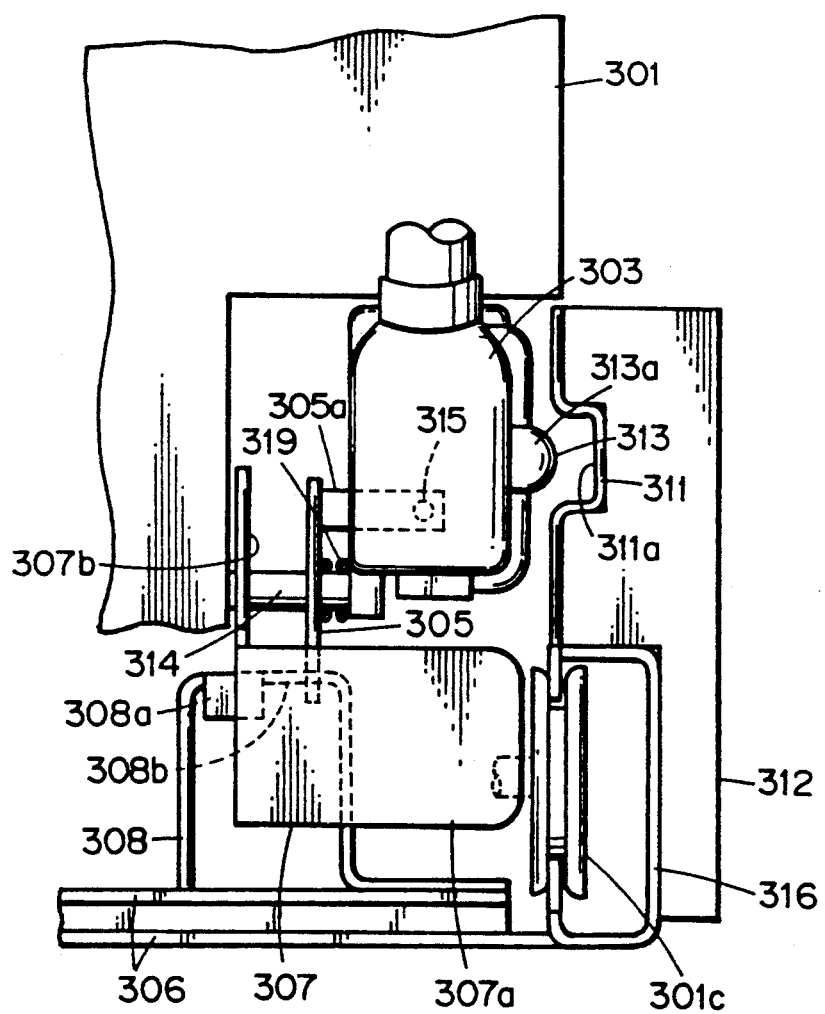
FIG. 15 shows a detail front view of the embodiment of FIG. 12.
Figure 16:
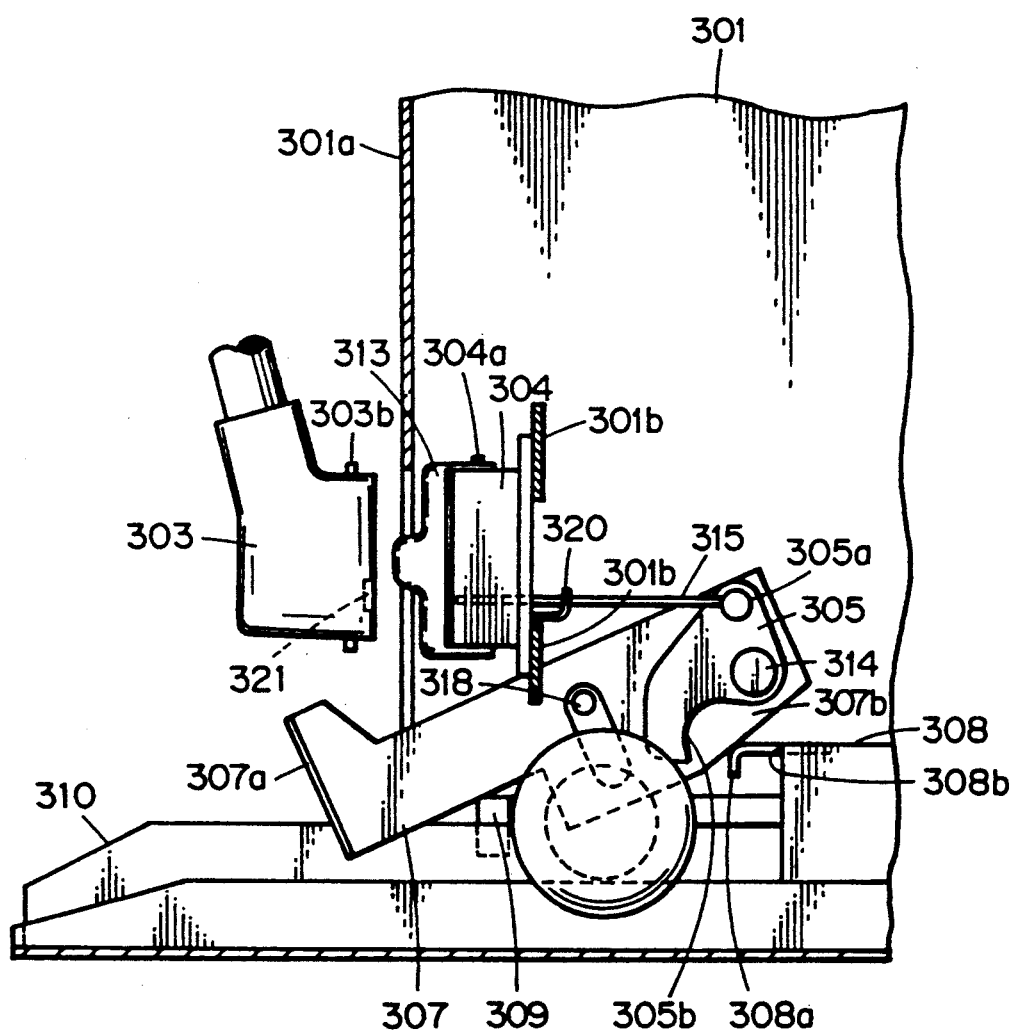
FIG. 16 shows a detail side view the embodiment of FIG. 12 with electrical plug disconnected and circuit breaker locking apparatus in the locked mode.
Figure 17:
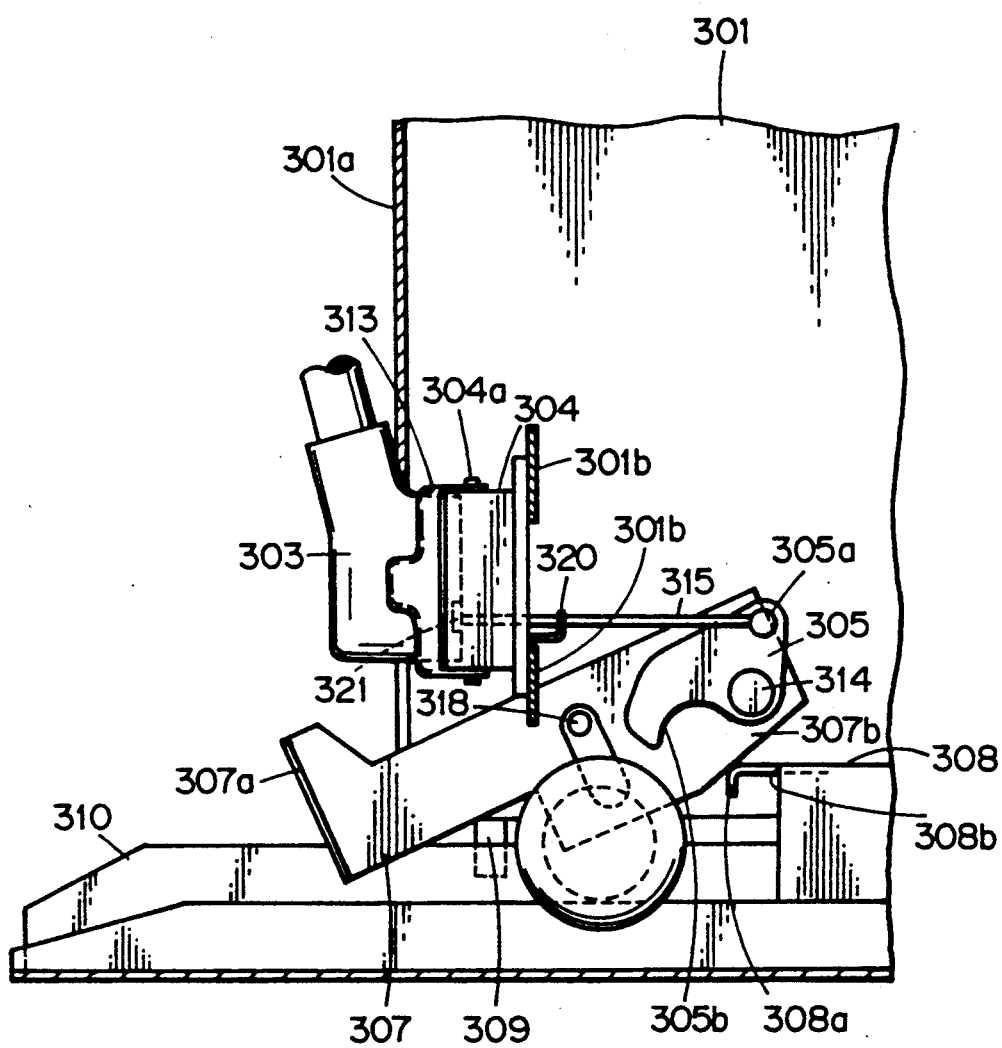
FIG. 17 shows a detail side view the embodiment of FIG. 12 with electrical plug connected and circuit breaker locking apparatus in the locked mode.
Figure 18:
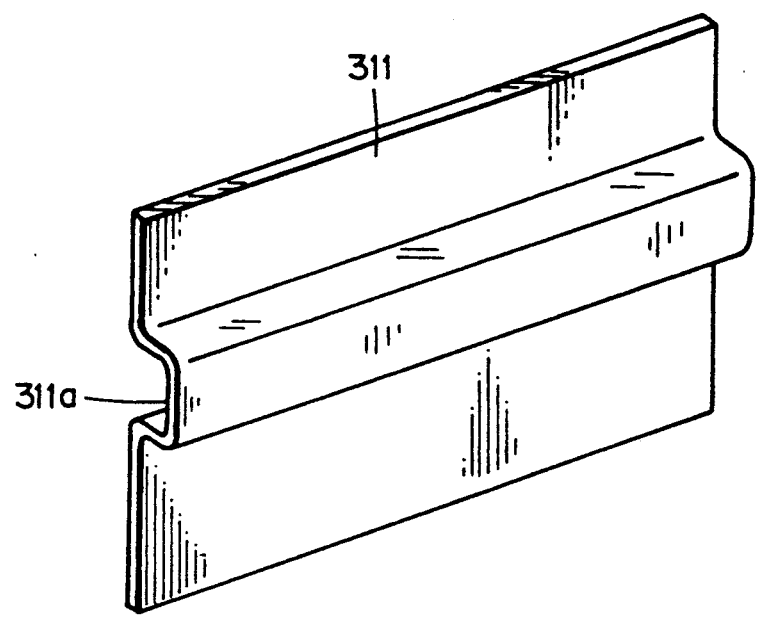
FIG. 18 shows a perspective view of the operator inhibiting device (311) used in the embodiment of FIG. 15.

FIG. 15 is of a partially expanded front view showing the plug 303 and surroundings. FIGS. 16 and 17 are side views of FIG. 15. In FIG. 15, wheels 301c allow the circuit breaker 301 to roll on guide rails 316 secured to the switchboard 302 toward the operation position. Above the guide rail 316 is provided a lock cover 311. FIG. 18 shows the detail of the lock cover 311. The lock cover 311 has a recess 311a which serves as a relief for the operating strap 313a of lock lever 313. The plug cover 307 which is rotatably mounted to the circuit breaker 301 by means of a pin 314, is urged by a spring 319 counterclockwise as shown in FIG. 16. The plug 304 has a horizontally slidable drive-pin 315 as shown in FIG. 16. The drive pin 315 abuts a driven portion 305a of a lock lever 305, and when the plug 303 is inserted, the drive pin, 315 is pushed out by a retainer 321 of the plug 303 thereby pushing the lock lever 305 at the driven portion 305a.

Figure 20:
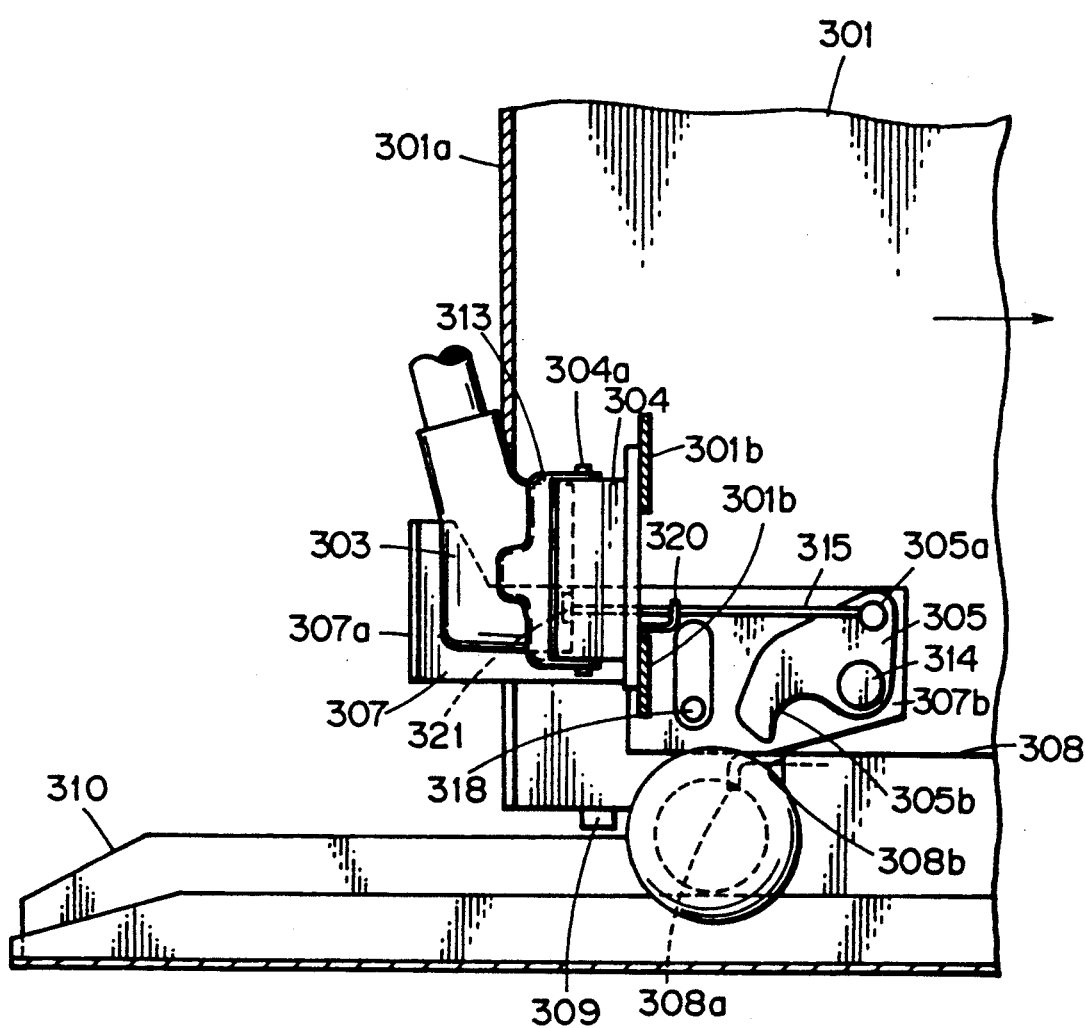
FIG. 20 shows a side view of a disengaged circuit breaker with the locking apparatus embodied in FIG. 12 in the unlocked mode being moved into engagement with a switchboard.

In FIG. 16, when the plug 303 is inserted into the plug 304 and locked by turning the lock lever 313, the retainer 321 forcibly pushes the drive pin 305. Thus, the lock lever 305 rotates about the pin clockwise to the position shown in FIG. 17. Then, the operator operates the operating lever 317 to lift the interlock pin 309 and then the circuit breaker may be moved to the operation position. As the circuit breaker 301 moves, the engaging portion 307b of the plug cover 307 abuts the projection 308a of guide 308 and the plug cover 307 is rotated clockwise about the pin 314. FIG. 20 shows the circuit breaker 301 moving from the test position to the operating position. From this position to the operation position, the front 307a of plug cover 307 covers the plug 303 and an operator cannot disconnect the plug 303. At the test position, the lock lever 305 will not rotate unless the plug 303 is inserted. With the plug 303 unplugged from the plug 304, if the operator attempts to lift up the interlock pin 309 in order to advance the circuit breaker 301 toward the operation position, a recess 305b of lock lever 305 engages the edge 308b of a guide plate 308 blocking the movement of the circuit breaker 301 toward the operating position.

Figure 21:
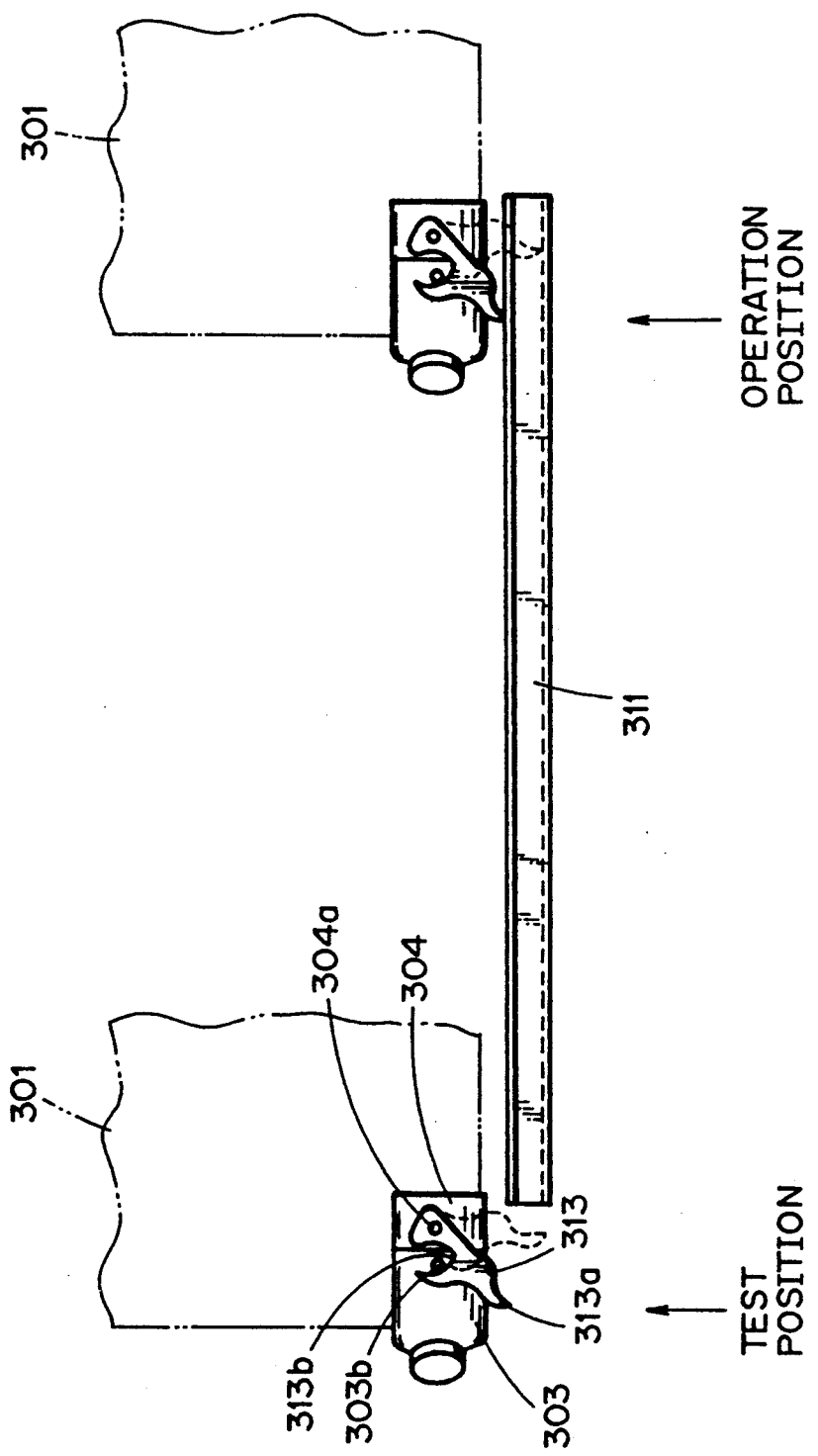
FIG. 21 is a top view of the embodiment of FIG. 12 showing the plugs and the operator inhibiting device and the positional relation therebetween.

FIG. 21 shows the positional relationship between the plugs 303 and 304 and the lock cover 311 in the test position and in the operation position. When the lock lever 313 mounted to the plug 304 is rotated clockwise about the pins 304a from the dotted line position to the solid line position of FIG. 21, the lock lever 313 receives the pins 303b into cutouts 313b locking the plug 303. Then, the circuit breaker 301 is further advanced toward the operation position, the operating strap 313a of lock lever 313 is covered by the lock cover 311 from the test position to the operation position. Thus, should the operator forget to lock the lock lever 313, the circuit breaker 301 can be advanced without difficulty and the plug cover 307 covers the plug 303 so as to inhibit an intended disconnection of plug 303.

Fourth embodiment

Figure 22A:
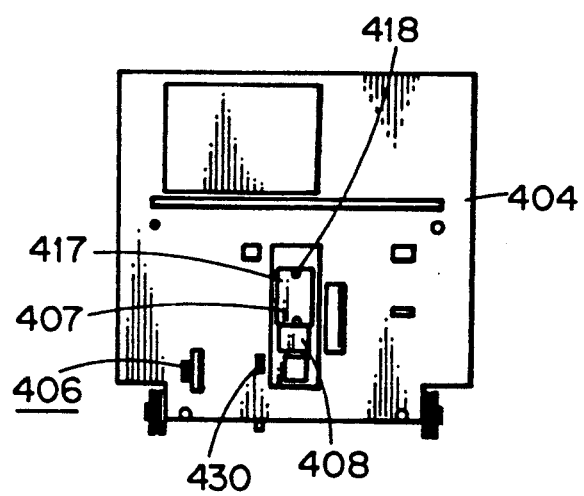
FIG. 22A shows a front view of a circuit breaker with a fourth embodiment of a circuit breaker locking apparatus.
Figure 22B:
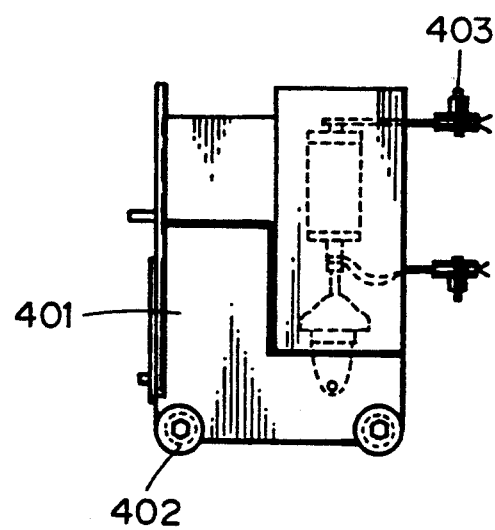
FIG. 22B shows a side view of a circuit breaker with a fourth embodiment of a circuit breaker locking apparatus.

FIG. 22A shows the general appearance of a fourth embodiment and FIG. 22B shows a side view of FIG. 22A. The fourth embodiment is another example of a construction restricting operator access to the plug on the switchboard side after the circuit breaker is advanced to the operation position. A cover 417 is usually bolted to a front panel 404 so that the circuit breaker 401 cannot be manually operated. The cover 407 is affixed to a warning plate which inhibits the opening of the cover 417 except when checking or maintaining. Unless the plug 406b is connected, the circuit breaker will not turn on or go into the operating mode.

Figure 23:
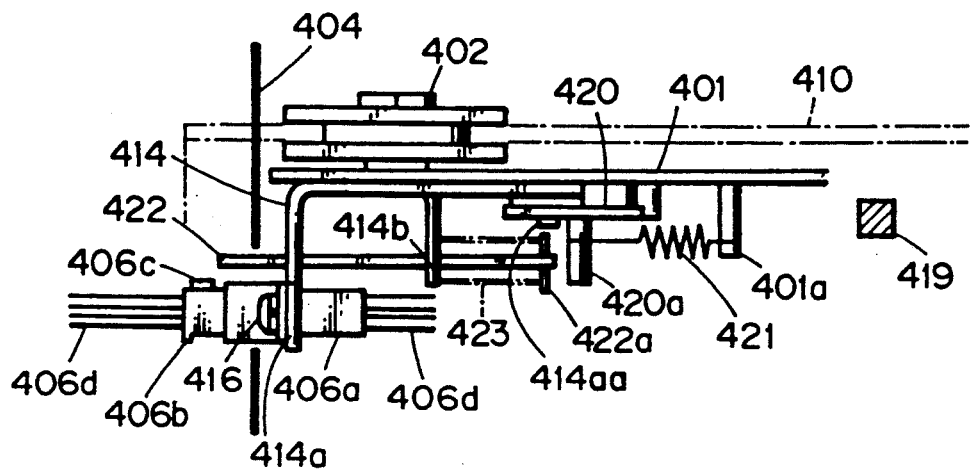
FIG. 23 shows a detail overhead view of the fourth embodiment of a circuit breaker locking apparatus disengaged from a switchboard with operator access to plug (406) unrestricted.
Figure 24:
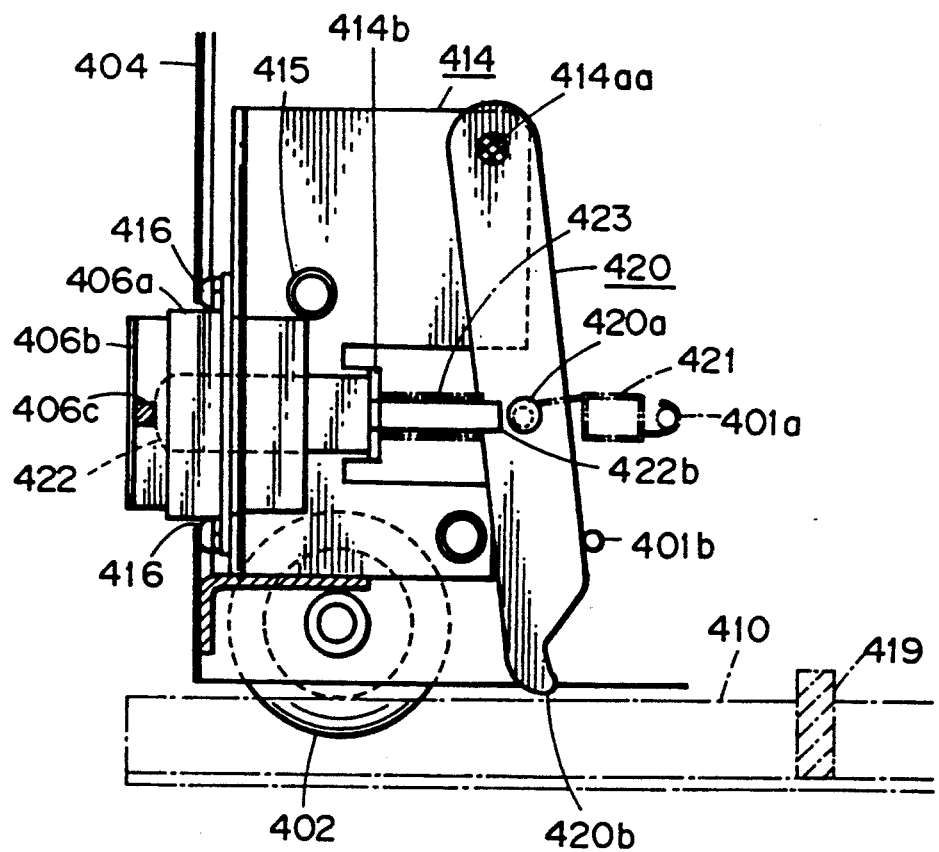
FIG. 24 shows a detail side view of FIG. 23.

Referring to FIGS. 23-24, a position-sensing pin 419 is provided on the floor. FIG. 23 is a detailed top view of the fourth embodiment and FIG. 24 is a side view of FIG. 23. A mounting plate 414 has a U-shaped arm having two opposed arms, one arm 414a of which firmly holds the breaker-side plug 406a secured by means of a bolt 416 and the other arm 414b which supports an access-inhibiting plate 422 slidably extending therethrough. The access-inhibiting plate 422 has a stopper 422a on its right end portion. Between the stopper 422a and the arm 414b is mounted a compressed spring 423 which urges the access-inhibiting plate 422 to the right in FIGS. 23-24. As shown in FIG. 24, at the top of the mounting plate 414, a position sensing lever 420 is suspended by means of a pin 414aa. Pin 420a is perpendicularly attached to the approximate middle of the position sensing lever 420. Between the pin 420a and a pin 401a projecting from the mounting plate 401 is arrayed a tension spring 421 so that the position sensing lever 420 is urged against the pin 401b.

Figure 25:
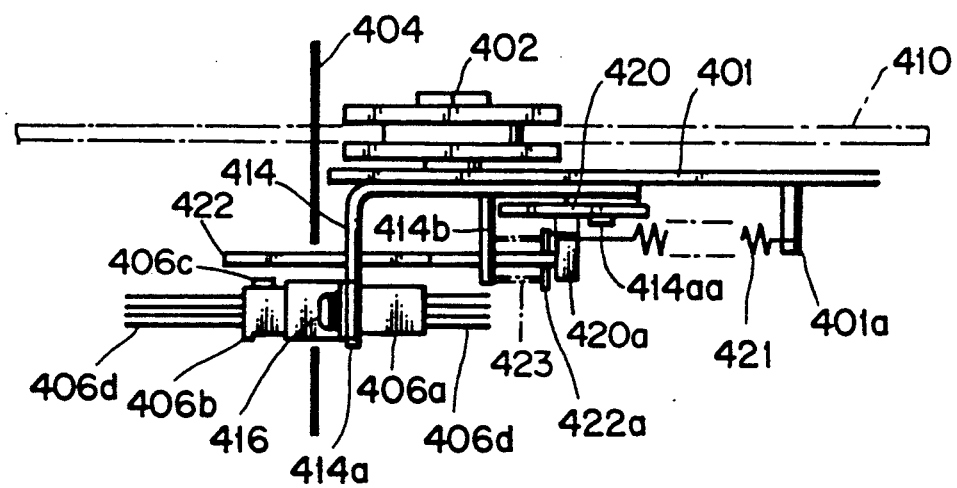
FIG. 25 shows a detail overhead view of the fourth embodiment of a circuit breaker locking apparatus engaged to a switchboard with operator access to plug (406) restricted.
Figure 26:
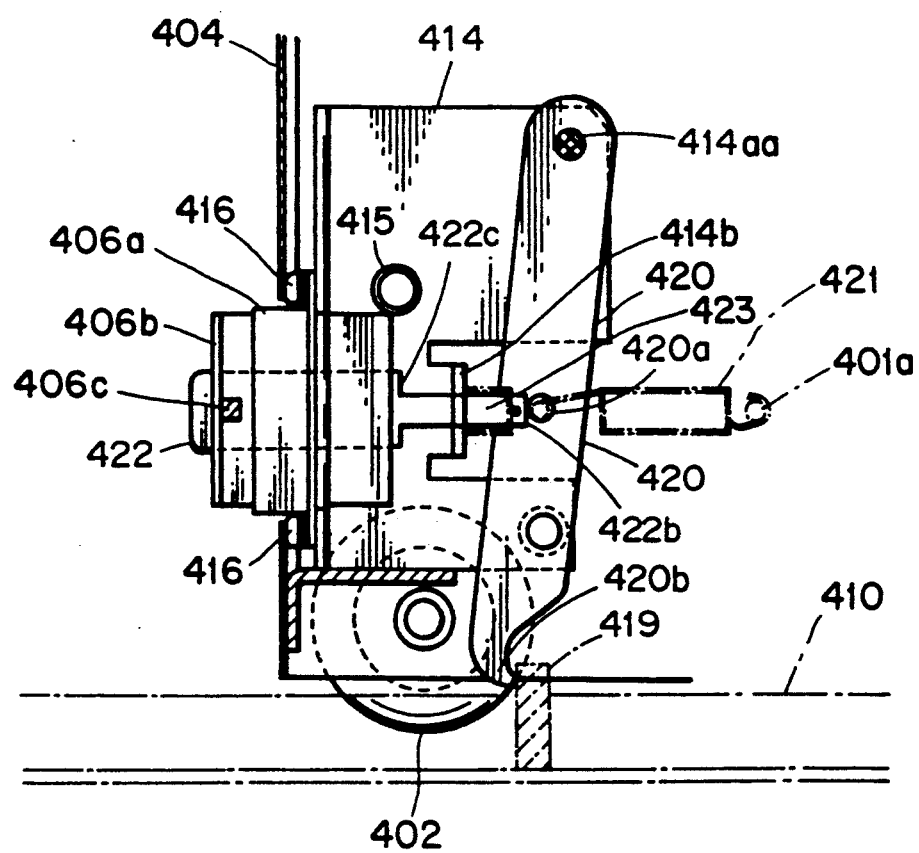
FIG. 26 shows a detail side view of FIG. 25.

FIGS. 23 and 24 show the circuit breaker 401 in the test position where the access-inhibiting plate 422 is urged to the right by a compressed spring 423. At this position, the lock button 406c can be manually operated to allow connection or disconnection of the plug 406b. FIGS. 25 and 26 show the circuit breaker 401 advanced to the operation position. As the circuit breaker 401 approaches the operation position, the distal end 420b of the lever 420 engages the position sensing pin 419, so that the lever 420 is rotated clockwise about the pin 414aa as shown in FIG. 26. The rotation of the lever 420 causes the pin 420a to push the access-inhibiting plate 422 at an end 422b thereof, so that the access-inhibiting plate 422 slides to the left through the hole formed in one arm of the U-shaped arm 414a until the opposing end 422b extends over the lock button 406c. Operation of the lock button 406c is inhibited and disconnection of plug 406b is made impossible. Even if the circuit breaker is advanced to the operating position with the plug 406b left unplugged from the plug 406a, an interlock device 430 on the front of the circuit breaker 401 inhibits the advancement of the circuit breaker when the circuit breaker is turned on, the turning on the circuit breaker during the movement of circuit breaker, and manually turning on the circuit breaker.

What is claimed is:

1. A locking apparatus for a drawer type circuit breaker, said circuit breaker moving on a switchboard and stopping at a disengage position and a engage position, said locking apparatus being mounted and having a first plug inserted into a second plug on the switchboard for establishing an electrical connection between said circuit breaker and said switchboard, said locking apparatus comprising:

plug-connection sensing means for sensing a connection of said first plug into said second plug;

lock means for locking said first plug inserted into said second plug when said lock means is at a lock position thereof, and for unlocking when said lock means is at an unlock position thereof;

a stopper fixed on said switchboard;

a lock pin drivingly connected to said plug-connection sensing means and said lock means, said lock pin moving to a contact position to contact the stopper to inhibit advancement of the circuit breaker from said disengage position to said engage position when said plug-connection sensing means does not detect that said first and said second plugs are connected with each other, while at the same time said lock means locks said first plug, and lock pin moving to a non-contact position to move out of contact with said stopper so that the circuit breaker is allowed to move from said disengage position to said engage position when said plug-connection sensing means detects that said first and second plugs are connected with each other while at the same time said lock means locks said first plug; and access-inhibiting means for inhibiting an operator to access to said first and second plugs when said circuit breaker is between said disengage position and said engage position.

2. A locking apparatus for a drawer type circuit breaker according to claim 1, wherein said plug-connection sensing means includes a flexible outer cable secured to said circuit breaker, and an inner wire slidably extending in said outer cable, said inner wire being driven at a first end thereof by said lock means to slide within said outer cable so as to cause said lock pin to move to said non-contact position when said lock means is at said lock position, said inner wire being driven at said first end by said lock means to slide in said outer cable so as to cause said lock pin to move to said contact position when said lock means is at said unlock position.

3. A locking apparatus for a drawer type circuit breaker according to claim 2, wherein said lock pin further includes an unlock means which is driven by said inner wire to displace said unlock means to said non-contact position.

4. A locking apparatus for drawer type circuit breaker according to claim 1, wherein said access-inhibiting means includes a wall extending along a path of said circuit breaker, said wall facing said lock means and being close to said lock means so access to said lock means is inhibited by said wall preventing unlocking of said lock means when said circuit breaker is midway between said disengage position and said engage position.

5. A locking apparatus for a drawer type circuit breaker, said locking apparatus comprising a position sensing pin provided on a switchboard so that said circuit breaker senses a location of said position sensing pin on said switchboard, and an access-inhibiting means, said access-inhibiting means further including:

an access-inhibiting plate movable between an occlude position where said access-inhibiting means advances over a lock means to make plugs inaccessible to an operator and a non-occlude position where said access-inhibiting plate retreats from said lock means to make said plugs accessible to the operator; and a position-sensing lever having a first end portion and a second end portion, said position-sensing lever being rotatably supported at said first end portion and being urged in a first direction; wherein when said circuit breaker moves from a disengage position to an engage position, said second end portion of said position sensing lever contacts said position-sensing pin, rotating said position sensing lever in a second direction opposite to said first direction driving said access-inhibiting means from said non-occlude position to said occlude position so as to displace said lock means making said plugs inaccessible to an operator.

6. Apparatus for regulating the electrical engagement of a drawer type circuit breaker to a switchboard comprising:

means for electrically connecting said drawer type circuit breaker to an electrical load;

means for mechanically securing said electrically connecting means to said drawer type circuit breaker while said drawer type circuit breaker is electrically engaged to said switchboard;

means for inhibiting electrical disconnection of said electrically connecting means while said drawer type circuit breaker is electrically engaged to said switchboard;

means for sensing an electrical connection between said drawer type circuit breaker and said electrical load;

means for sensing the mechanical securing of said electrically connecting means by said mechanically securing means; and, means for preventing said electrical engagement of said drawer type circuit breaker to said switchboard when said mechanically securing means is unsecure or when said electrical connection sensing means is not sensing the electrical connection between said drawer type circuit breaker and said electrical load.

7. Apparatus as recited in claim 6 wherein said electrically connecting means are aligned male and female plugs, said female plug attached to said drawer type circuit breaker, said male plug attached to said electrical load.

8. Apparatus as recited in claim 6 wherein said mechanically securing means is a lever rotatably mounted on said drawer type circuit breaker in confronting relationship to said electrically connecting means.

9. Apparatus as recited in claim 8 wherein said inhibiting means is an obstruction preventing rotation of said lever.

10. Apparatus as recited in claim 6 wherein said preventing means is a locking arm slidingly contacting said switchboard.

11. Apparatus as recited in claim 6 wherein said electrical connection sensing means is a rod internal to said female plug displaced by connection of said male plug.

12. Apparatus as recited in claim 6 wherein said mechanical securing sensing means is a cable displaced by said securing means when secure.

13. Apparatus as recited in claim 11 wherein said rod operates to enable disablement of said preventing means when sensing said connection of said male plug.

14. Apparatus as recited in claim 12 wherein said cable operates to enable disablement of said preventing means when displaced by said mechanically securing means.

* * * * *